US009956688B2

(12) United States Patent
Ferguson et al.

(10) Patent No.: US 9,956,688 B2
(45) Date of Patent: May 1, 2018

(54) SYSTEM AND METHOD FOR PREDICTING ROBOTIC POWER DISCONNECTION

(71) Applicant: Fetch Robotics, Inc., San Jose, CA (US)

(72) Inventors: Michael Ferguson, San Jose, CA (US); Derek King, San Jose, CA (US)

(73) Assignee: Fetch Robotius, Inc., San Jose, CA (US)

( * ) Notice: Subject to any disclaimer, the term of this patent is extended or adjusted under 35 U.S.C. 154(b) by 114 days.

(21) Appl. No.: 15/096,896

(22) Filed: Apr. 12, 2016

(65) Prior Publication Data

US 2017/0291303 A1 Oct. 12, 2017

(51) Int. Cl.
*B25J 9/16* (2006.01)
*B25J 19/02* (2006.01)

(52) U.S. Cl.
CPC ........... *B25J 9/1694* (2013.01); *B25J 19/027* (2013.01); *Y10S 901/01* (2013.01)

(58) Field of Classification Search
CPC ....... B25J 9/1694; B25J 19/027; Y10S 901/02
See application file for complete search history.

(56) References Cited

U.S. PATENT DOCUMENTS

| | | |
|---|---|---|
| 8,688,275 B1 | 4/2014 | LaFary et al. |
| 9,358,975 B1 | 6/2016 | Watts |
| 9,515,424 B2* | 12/2016 | Im .............................. B60L 3/00 |
| 2006/0161303 A1* | 7/2006 | Wang ..................... B25J 9/1689 700/259 |
| 2013/0151061 A1* | 6/2013 | Hong ........................ B08B 9/08 701/25 |
| 2017/0033495 A1* | 2/2017 | Du ......................... H01R 13/53 |

OTHER PUBLICATIONS

Park, Jong Jin and Benjamin Kuipers, A Smooth Control Law for Grateful Motion of Differential Wheeled Mobile Robots in 2D Environment, Proceedings—IEEE International Conference on Robotics and Automation, Apr. 2011, 2011 IEEE International Conference on Robotics and Automation (ICRA-11).
Gerkey, Brian P. and Kurt Konolige, Planning and Control in Unstructured Terrain, In Workshop on Path Planning on Costmaps, Proceedings of the IEEE International Conference on Robotics and Automation, Jan. 2008 (ICRA , 2008).
Arras, Kai O, Oscar Martinez Mozos, and Wolfram Burgard, Using Boosted Features for the Detection of People in 2D Range Data, 2007 IEEE International Conference on Robotics and Automation, ICRA 2007, Rome, Italy, Apr. 10-14, 2007.

(Continued)

*Primary Examiner* — Khoi H Tran
*Assistant Examiner* — Robert T Nguyen
(74) *Attorney, Agent, or Firm* — J. Steven Svoboda (57) ABSTRACT

A system for predicting a robotic power disconnection includes: a controller; and a robot controllable by the controller, the robot including: a power connector configured to provide power to the robot; and a sensor operably connected to the controller, the sensor configured to detect a change in a field that varies with a changing condition of the power connector, the sensor further configured to alert the controller regarding the change in the field, the controller configured to adjust current through the power connector in response to the alert.

45 Claims, 6 Drawing Sheets

(56) References Cited

OTHER PUBLICATIONS

Thrun, Sebastian, Wolfram Burgard, and Dieter Fox, Probabilistic Robots, The MIT Press, Cambridge, Massachusetts, 2005, pp. 97-113.
Fox, Dieter, Wolfram Burgard, and Sebastian Thrun, The Dynamic Window Approach to Collision Avoidance, IEEE Robotics & Automation Magazine, vol. 4, No. 1, 1997.
Freund, Yoav and Robert E. Schapire, A Decision-Theoretic Generalization of On-Line Learning and an Application to Boosting, Journal of Computer and System Sciences, vol. 55, pp. 119-139, 1997.

* cited by examiner

SYSTEM AND METHOD FOR PREDICTING ROBOTIC POWER DISCONNECTION

PRIORITY CLAIM

The present application claims the priority benefit of U.S. provisional patent application No. 62/146,395 filed Apr. 12, 2015 and entitled "System and Method for Detecting Robotic Power Disconnection," the disclosure of which is incorporated herein by reference.

SUMMARY

Embodiments of this invention relate in general to a system and method for predicting a power disconnection.

A system for predicting a robotic power disconnection includes: a controller; and a robot controllable by the controller, the robot including: a power connector configured to provide power to the robot; and a sensor operably connected to the controller, the sensor configured to detect a change in a field that varies with a changing condition of the power connector, the sensor further configured to alert the controller regarding the change in the field, the controller configured to adjust current through the power connector in response to the alert.

A system for predicting a robotic power disconnection includes: a controller; and a robot controllable by the controller, the robot including: a power connector configured to provide power to the robot, the power connector comprising a magnet; and a magnetic sensor operably connected to the controller, the magnetic sensor configured to detect a change in a magnetic field created by the magnet, the magnetic sensor further configured to alert the controller regarding the change in strength, the controller configured to adjust current through the power connector in response to the alert.

A method for predicting a robotic power disconnection includes: receiving, by a controller configured to control a robot, the robot including: a power connector configured to provide power to the robot; and a sensor operably connected to the controller, the sensor configured to detect a change in a field that varies with a changing condition of the power connector, from the sensor, an alert regarding the change in the field; and adjusting, by, the controller, in response to the alert, current through the power connector.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The system for predicting robotic power disconnection includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

Embodiments of this invention relate in general to a system and method for predicting a power disconnection, and more particularly to a system and method for predicting a robotic power disconnection, and still more particularly to a system and method for predicting a robotic power disconnection in robots that are charged by a physical power connector, and even more particularly to a system and method for predicting a robotic power disconnection in mobile robots that are charged by a physical power connector.

Typically, although not necessarily, the charging of a robot using a physical power connector is executed by a human user. Typically, although not necessarily, the user will remove the power connector to terminate the charging process. According to embodiments of the invention, the system detects an approach of an appendage and predicts that the appendage will disconnect the power to the robot so that the system can adjust current through the power connector prior to the appendage disconnecting the power. Alternatively, or additionally, the system can eliminate the current through the power connector prior to the appendage disconnecting the power. The system's anticipation of a power disconnection permits minimizing one or more of arcing and wear on a power plug.

According to embodiments of the invention, a system for predicting a robotic power disconnection comprises a robot and further comprises a controller. For example, the robot is controllable by the controller.

According to other embodiments of the invention, the power connector comprises a magnet. For example, the magnet may be embedded in the power connector. For example, the magnet may be embedded in casing of the charge connector. For example, the magnet may be embedded in the casing of the charge connector so that the magnet is one or more of not exposed and not visible to a user.

According to yet other embodiments of the invention, the robot further comprises a sensor operably connected to the controller. For example, the sensor is configured to detect an obstacle. For example, the sensor is configured to detect an appendage. For example, the sensor is configured to detect a human appendage that is initiating a robotic power disconnection.

For example, the sensor comprises one or more of a magnetic sensor, a capacitive sensor, an electric field sensor, a Hall Effect sensor, a force sensor, an infrared (IR) sensor, an inductive sensor, a scanning laser range finder, a depth camera, an ultrasonic range finder, a radar sensor, a Red-Green-Blue (RGB) camera sensor, a grayscale camera sensor, an acoustic sensor, a sonar sensor, a strain gauge, and another sensor. The following example focuses on a magnetic sensor. If for example, the sensor comprises one or more of a force sensor and a strain gauge, the sensor may measure a displacement of a small spring comprised in the sensor. If for example, the sensor comprises a capacitive sensor, the sensor may measure an electric field. For example, the sensor comprises a magnetic sensor. If for example, the sensor comprises an inductive sensor, the sensor may measure one or more of an electric field and a magnetic field. If for example, the sensor comprises one or more of an infrared sensor and another optical sensor, the sensor may measure reflected light. For example, the magnetic sensor is configured to detect a change in the magnetic field created by the magnet. For example, the magnetic sensor is configured to detect a change in the strength of the magnetic field created by the magnet. For example, the robot is a mobile robot. For example, the robot is a non-mobile robot.

According to yet further embodiments of the invention, the magnetic sensor is further configured to alert the controller regarding a change in detected magnetic field. For example, the magnetic sensor is further configured to alert the controller regarding a change in strength of the detected magnetic field. For example, the change in strength of the detected magnetic field may occur due to one or more of a partial disconnection of the power connector and a complete disconnection of the power connector. For example, the change in strength of the detected magnetic field may occur due to one or more of a partial disconnection of the power connector by the human user and a complete disconnection of the power connector by the human user. For example, the change in strength of the detected magnetic field may occur for reasons other than the one or more of a partial disconnection of the power connector and a complete disconnection of the power connector.

According to still other embodiments of the invention, the controller may be configured to adjust current through the power connector in response to the alert. For example, the controller may decrease the current through the power connector in response to the alert. For example, the controller may eliminate the current through the power connector in response to the alert. For example, the controller may maintain the current through the power connector at its previous level in response to the alert. For example, the controller may increase the current through the power connector in response to the alert.

According to still further embodiments of the invention, the sensor is configured to detect movement near the robot of an appendage of a human user. For example, the appendage comprises an arm. For example, the appendage comprises a leg. For example, the sensor is configured to detect the movement near the robot of an arm of the human user. For example, the sensor is configured to detect the movement near the robot of the arm of the human user who is reaching to unplug the power connector.

According to yet other embodiments of the invention, the controller may be configured to adjust the current passing through the power connector in response to the detection of the human user's appendage by the sensor. For example, the controller may decrease the current through the power connector in response to the detection of the appendage. For example, the controller may eliminate the current through the power connector in response to the detection of the appendage. For example, the controller may maintain the current through the power connector at its previous level in response to the detection of the appendage. For example, the controller may increase the current through the power connector in response to the detection of the appendage.

According to other embodiments of the invention, the robot may comprise two or more sensors. For example, the processor may be configured to detect the appendage by integrating data received from two or more of the two or more sensors.

Embodiments of the invention ensure that a disconnection is quickly predicted and minimize the current passing through the power connector at disconnection time.

According to embodiments of the invention, using a pre-determined jump condition, the controller classifies regions scanned by the sensor into regions comprising an appendage and regions not comprising an appendage. For example, the controller classifies the regions using a metric. For example, the controller classifies the regions using a combination of metrics. For example, the controller classifies the regions by fitting a circle to scan points scanned by the sensor.

Then, according to embodiments of the invention, using the jump condition, the controller classifies the regions by checking that the circle falls within an allowable region of radii. For example, using the jump condition, the controller checks a maximum distance between points and discards segments that are one or more of too large to comprise an appendage and too small to comprise an appendage. For example, using the jump condition, the controller requires a pre-determined minimum number of points in order to identify a region as comprising an appendage. For example, one or more of metrics used for the jump condition and thresholds used for the jump condition may be automatically trained from sample data using algorithms. For example, the algorithms comprise one or more of Adaptive Boosting ("Adaboost") and a decision tree.

Figure 1:
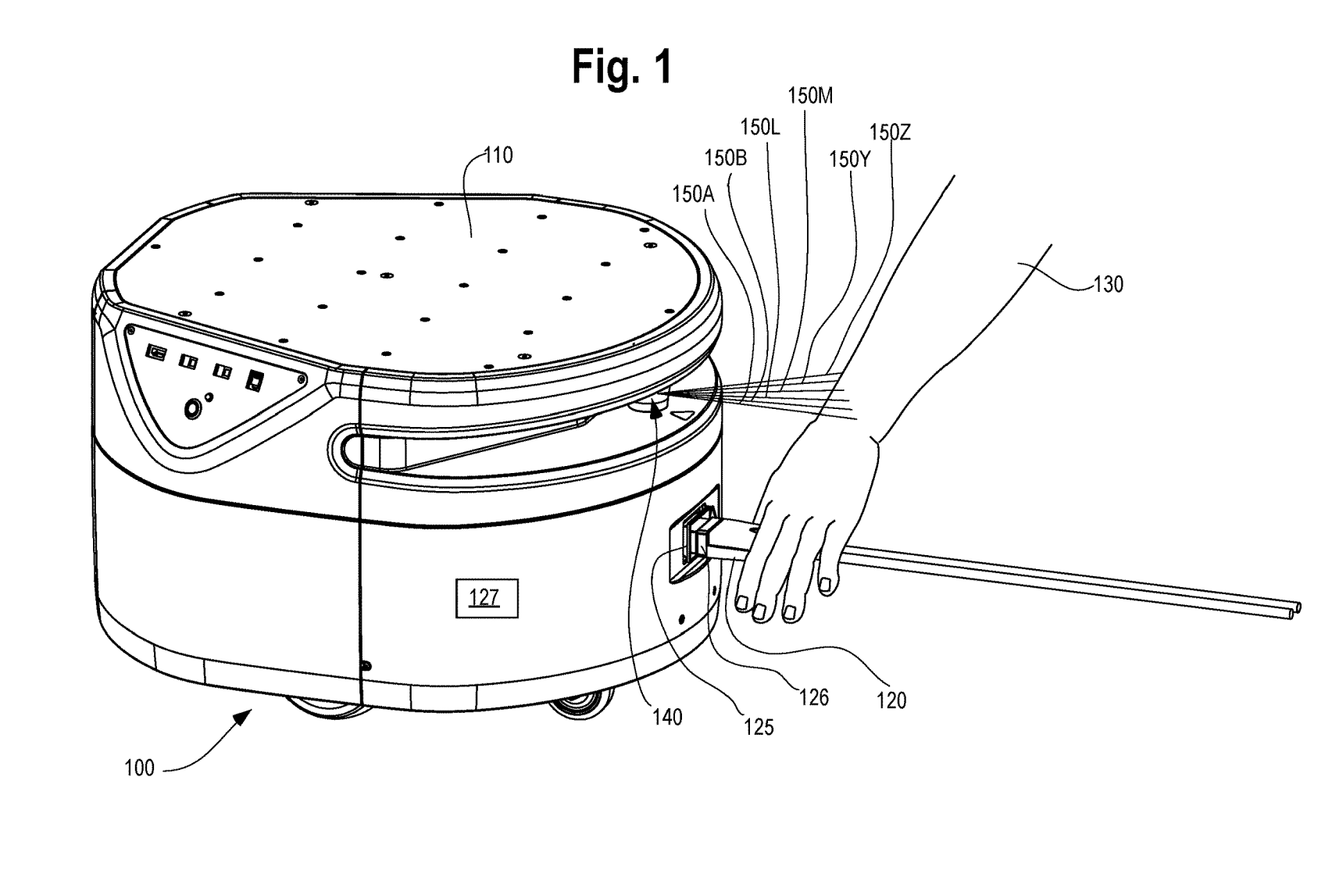
FIG. 1 is a diagram of a system for predicting robotic power disconnection.

FIG. 1 is a diagram of a system 100 for predicting robotic power disconnection. The system 100 comprises a robot 110 and a power connector 120. For example, the power connector 120 comprises a power connector cable 120. The robot 110 comprises a power connector receptacle 125. The power connector 120 comprises a power connector plug 126 that is configured to mate with the power connector receptacle 125 to complete a power connection to provide power to the robot 110. The robot 110 further comprises a controller 127. The controller 127 is configured to control the system 100 for predicting robotic power disconnection. For example, the controller 127 comprises a processor 127. For example, the controller 127 comprises a computer 127.

The system 100 is configured to determine when an appendage 130 is executing a power disconnection. When the controller 127 identifies an appendage 130, the controller 127 adjusts current through the power connector 120 and on to the robot 110 to avoid the various downsides of an unplanned power disconnection including one or more of arcing and wear on the power connector plug 126. For example, when the controller 127 identifies the appendage 130, the controller 127 eliminates the current through the robot 110.

The robot 110 further comprises a sensor 140. The controller 127 controls the sensor 140. For example, the sensor 140 comprises a scanning laser range finder 140. As the scanning laser range finder 140 rotates, it makes a number of laser scans 150A, 150B . . . 150L, 150M . . . 150Y, 150Z.

Figure 2:
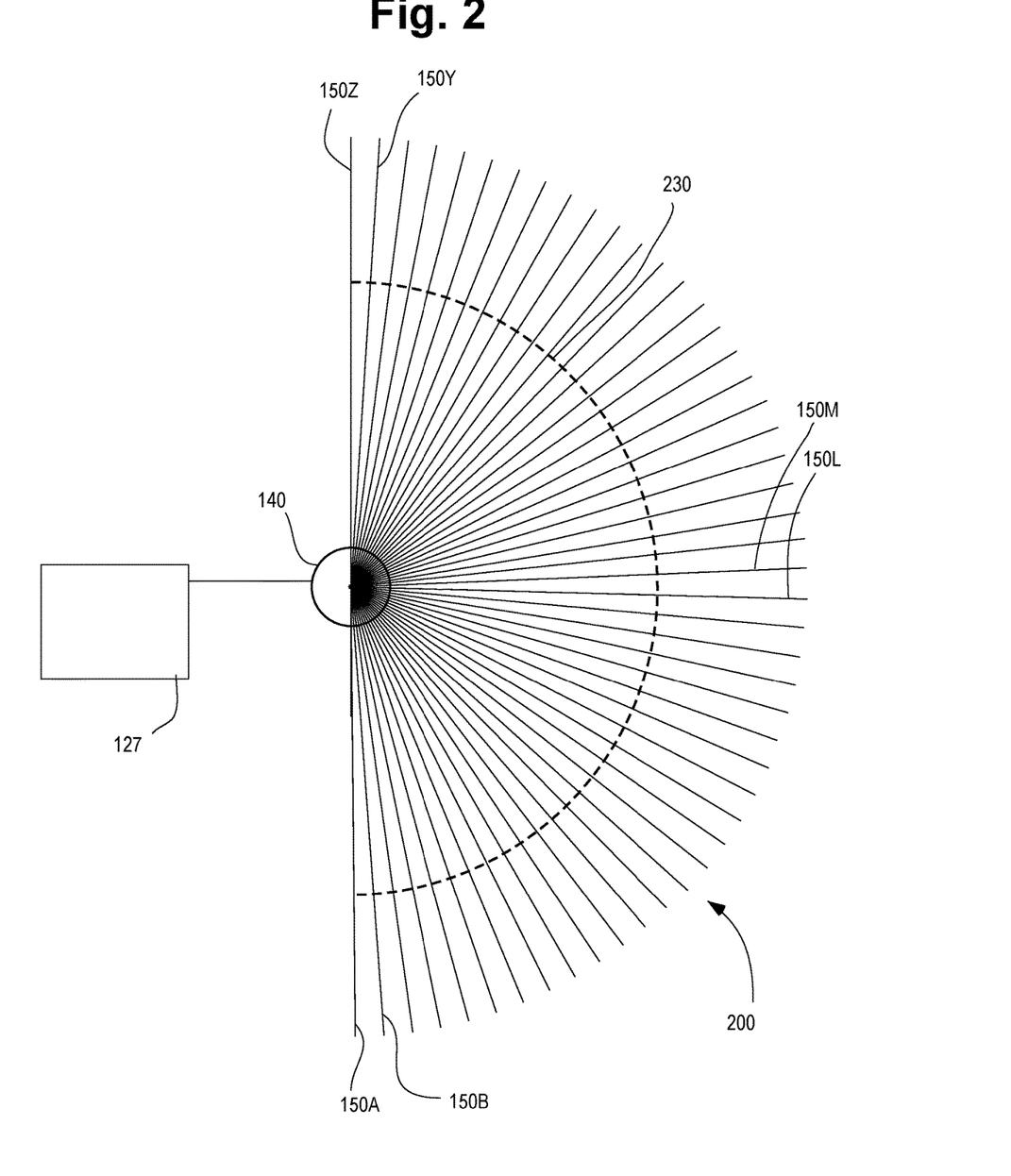
FIG. 2 is a diagram of a system for predicting robotic power disconnection.

FIG. 2 is a diagram of a system 200 for predicting robotic power disconnection.

As shown in FIG. 2, according to a first set of embodiments, the system 200 comprises the controller 127 and the sensor 140.

According to this set of embodiments, the controller 127 is programmed with a bounding region 230. The bounding region 230 comprises a spatial region 230 that is meant to be kept free from human appendages in order to prevent an unplanned power disconnection. The bounding region 230 comprises one or more of a bounding box 230, a bounding circle 230, and another bounding region 230. The controller 127 is provided with a predetermined threshold of points above which the controller 127 determines that an appendage lies within the bounding region 230 and the controller 127 predicts a power disconnection.

For example, the scanning laser range finder 140 can rotate between approximately ten times per second and approximately fifty times per second. As the scanning laser range finder 140 rotates, it makes a number of laser scans 150A, 150B . . . 150L, 150M . . . 150Y, 150Z. Accordingly, typically there may be a very small time increment between successive laser scans, for example, between laser scans 150A and 150B, of no more than approximately 0.001 second.

As the laser scans 150A, 150B . . . 150L, 150M . . . 150Y, 150Z arrive to the controller 127, the controller 127 counts a number of points 150A, 150B . . . 150L, 150M . . . 150Y, 150Z lying within the bounding region 230. If the controller 127 determines that the threshold is exceeded, the controller 127 determines that the appendage 130 has intruded within the bounding region 230. Accordingly, the controller 127 predicts a power disconnection. Accordingly, the controller 127 notifies a computer (not shown) regarding the predicted power disconnection. The computer (not shown) then directs a microprocessor (not shown) to adjust current through the power connector (not shown). The computer (not shown) then directs the microprocessor (not shown) to eliminate the current through the power connector (not shown). Alternatively, or additionally, the computer (not shown) directs the controller 127 to reduce the current through the power connector (not shown). Alternatively, or additionally, the computer (not shown) directs the controller 127 to eliminate the current through the power connector (not shown). Alternatively, or additionally, instead of predicting the intrusion of the appendage within the bounding region 230, the controller 127 notes the intrusion and reduces the current through the power connector (not shown). Alternatively, or additionally, instead of predicting the intrusion of the appendage within the bounding region 230, the controller 127 notes the intrusion and eliminates the current through the power connector (not shown).

Figure 3A:
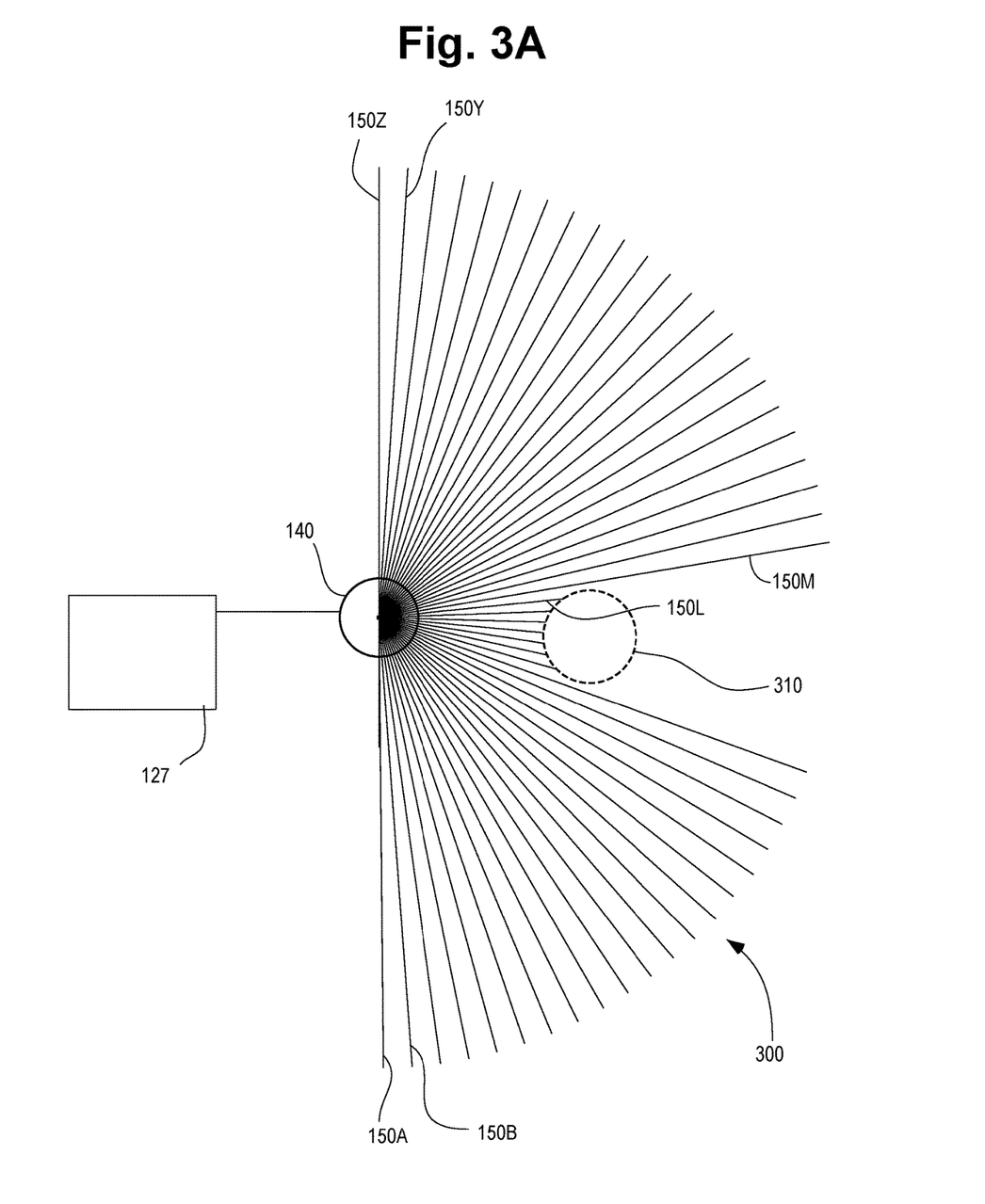
FIGS. 3A-3B are a pair of diagrams of a system for predicting robotic power disconnection.
Figure 3B:
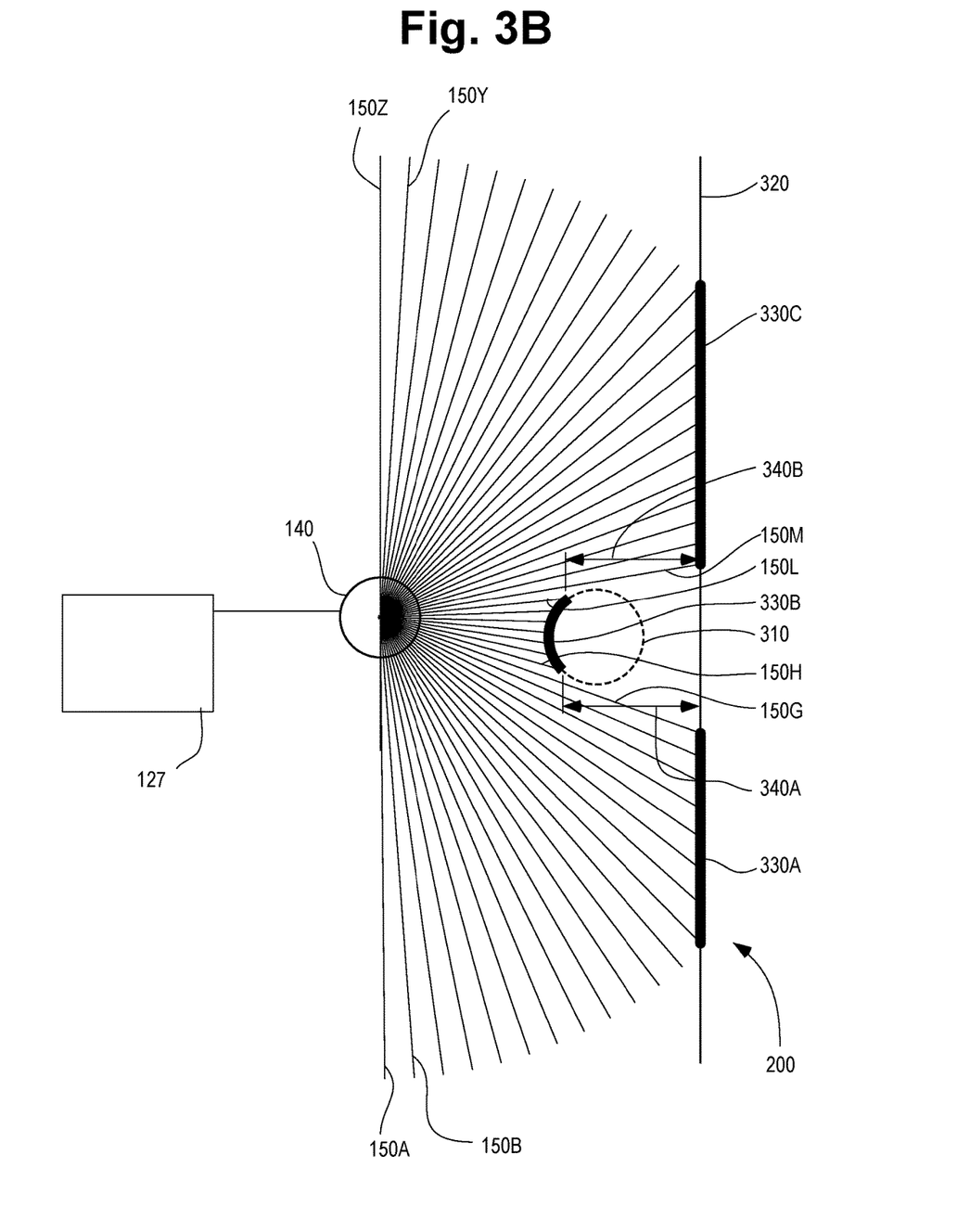

FIGS. 3A-3B are a pair of diagrams of a system 300 for predicting robotic power disconnection.

As shown in FIG. 3A according to a second set of embodiments, the controller 127 is programmed to identify a recognized feature 310 using the laser scans 150A, 150B . . . 150L, 150M . . . 150Y, 150Z. The controller 127 is further programmed to identify a non-recognized feature 320 using the laser scans 150A, 150B . . . 150L, 150M . . . 150Y, 150Z. For example, the non-recognized feature 320 comprises a wall 320.

The controller 127 directs the sensor 140 to transmit the laser scans 150A, 150B . . . 150L, 150M . . . 150Y, 150Z to identify the recognized feature 310. For example, the recognized feature 310 comprises an appendage 310. As the laser scans 150A, 150B . . . 150L, 150M . . . 150Y, 150Z arrive, the controller 127 splits the laser scans 150A, 150B . . . 150L, 150M . . . 150Y, 150Z into a first region 330A, a second region 330B, and a third region 330C using a pre-determined jump condition. For example, the jump condition may require that the laser scan 150A, 150B . . . 150L, 150M . . . 150Y, 150Z be segmented into regions 330A, 330B, 330C in which no successive laser scans 150A, 150B . . . 150L, 150M . . . 150Y, 150Z are more than approximately 6 cm apart.

As depicted, using the jump condition, the controller 127 determines that the laser scan 150G is the last laser scan before a first discontinuity 340A that separates the laser scan 150G from the laser scan 150H. The controller 127 determines that accordingly, the first region 330A comprises laser scans 150A, 150B . . . 150G. Accordingly, the controller 127 determines that the first region 330A comprises laser scans 150A-150G.

Similarly, as depicted, using the jump condition, the controller 127 determines that the laser scan 150H is the first laser scan after the first discontinuity 340A that separates the laser scan 150G from the laser scan 150H. The controller 127 further determines that the laser scan 150L is the last laser scan before a second discontinuity 340B that separates the laser scan 150L from the laser scan 150M. Accordingly, the controller 127 determines that the second region 330B comprises laser scans 150G, 150H . . . 150L.

Similarly, as depicted, using the jump condition, the controller 127 determines that the laser scan 150M is the first laser scan after the second discontinuity 340B that separates the laser scan 150L from the laser scan 150M. The controller 127 further determines that the laser scan 150Z is the last laser scan performed by the sensor 140. Accordingly, the controller 127 determines that the third region 330C comprises laser scans 150M, 150N . . . 150Y, 150Z.

Applying the jump condition, the controller 127 identifies the non-recognized feature 320 as a likely wall 320 and directs that its presence be ignored.

Applying the jump condition, the controller 127 identifies the recognized feature 310 as a likely appendage 310 and accordingly concludes that a robotic power disconnection is imminent.

Accordingly, the controller 127 notifies a computer (not shown) regarding the predicted power disconnection. The computer (not shown) then directs a microprocessor (not shown) to adjust current through the power connector (not shown). The computer (not shown) then directs the microprocessor (not shown) to eliminate the current through the power connector (not shown). Alternatively, or additionally, the computer (not shown) directs the controller 127 to reduce the current through the power connector (not shown). Alternatively, or additionally, the computer (not shown) directs the controller 127 to eliminate the current through the power connector (not shown). Alternatively, or additionally, instead of predicting the appendage 310, the controller 127 notes the intrusion and reduces the current through the power connector (not shown). Alternatively, or additionally, instead of predicting the appendage 310, the controller 127 notes the intrusion and eliminates the current through the power connector (not shown).

Figure 4A:
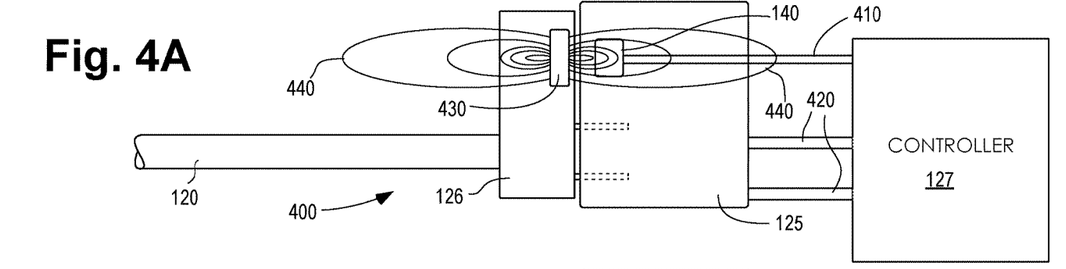
FIGS. 4A-4C are a set of diagrams of a system for predicting robotic power disconnection.
Figure 4B:
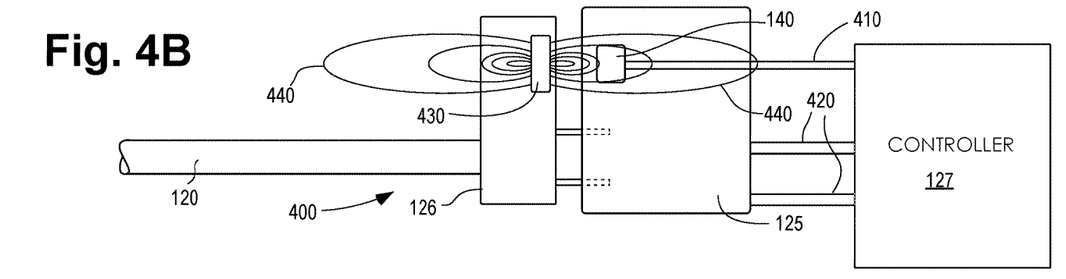
Figure 4C:
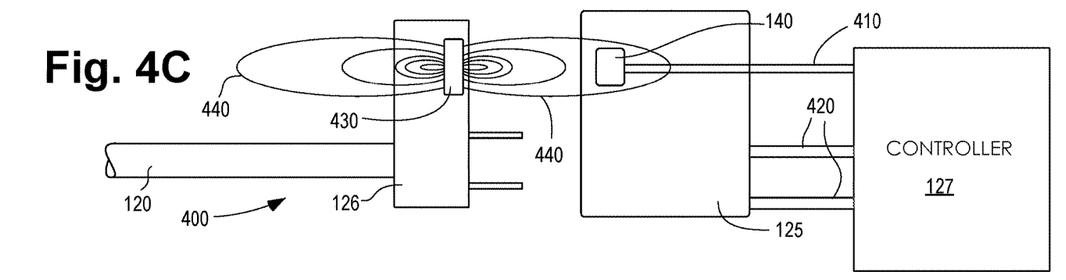

FIGS. 4A-4C are a set of diagrams of a system 400 for predicting robotic power disconnection. The system 400 comprises the robot 110 and the power connector 120. The robot 110 comprises the power connector receptacle 125, the controller 127, and the sensor 140. The power connector 120 comprises a power connector cable 120. The power connector 120 comprises the power connector plug 126.

The sensor 140 comprises a magnetic sensor 140. The controller 127 is operably connected to the sensor 140 via sensor wires 410. The controller 127 is operably connected to the power connector receptacle 125 via power lines 420. The power connector plug 126 comprises a magnet 430. The magnet 430 generates a first magnetic field 440. The sensor 140 detects the magnetic field 440.

In FIG. 4A, the controller 127 receives from the magnetic sensor 140 via the sensor wires 410 information regarding the magnetic field 440 that is sensed by the sensor 140 while a full power connection exists between the power connector plug 126 and the power connector receptacle 125. The power connector plug 126 comprises power connector plug contacts 450 that are fully engaged with the power connector receptacle 125.

In FIG. 4B, as the power connector plug contacts 450 are removed from the power connector receptacle 125, the sensor 140 moves relative to the magnetic field 440. Accordingly, the sensor 140 senses a different portion of the magnetic field 440. The sensor 140 alerts the controller 127 regarding the change in the portion of the magnetic field 440 that is sensed by the sensor 140.

Accordingly, the controller 127 predicts one or more of a partial power disconnection and a complete power disconnection. The controller predicts the one or more of a partial power disconnection and a complete power disconnection to a computer (not shown). The computer (not shown) then directs a microprocessor (not shown) to adjust current through the power connector (not shown) and on to the robot 110. The computer (not shown) then directs the microprocessor (not shown) to eliminate the current through the power connector 120 and on to the robot 110. Alternatively, or additionally, the computer (not shown) directs the controller 127 to adjust the current through the power connector 120 and on to the robot 110. Alternatively, or additionally, the computer (not shown) directs the controller 127 to eliminate the current through the power connector 120 and on to the robot 110. Alternatively, or additionally, instead of predicting the one or more of a partial power disconnection and a complete power disconnection, the controller 127 notes the one or more of a partial power disconnection and a complete power disconnection and the controller 127 reduces the current through the power connector 120 and on to the robot 110. Alternatively, or additionally, instead of predicting the one or more of a partial power disconnection and a complete power disconnection, the controller 127 notes the one or more of a partial power disconnection and a complete power disconnection and eliminates the current through the power connector 120 and on to the robot 110.

In FIG. 4C, the power connector plug contacts 450 have been fully removed from the power connector receptacle 125, and the sensor 140 senses a different portion of the magnetic field 440 than was detected in FIGS. 4A and 4B. Power disconnection occurs at this point in time but one or more of arcing and wear on the power connector plug 126 have been minimized due to one or more of the prediction of a power disconnection made by the controller 127 and the action taken by the controller 127 that led to the reduction or elimination of the current through the power connector 120 and on to the robot 110.

Figure 5:
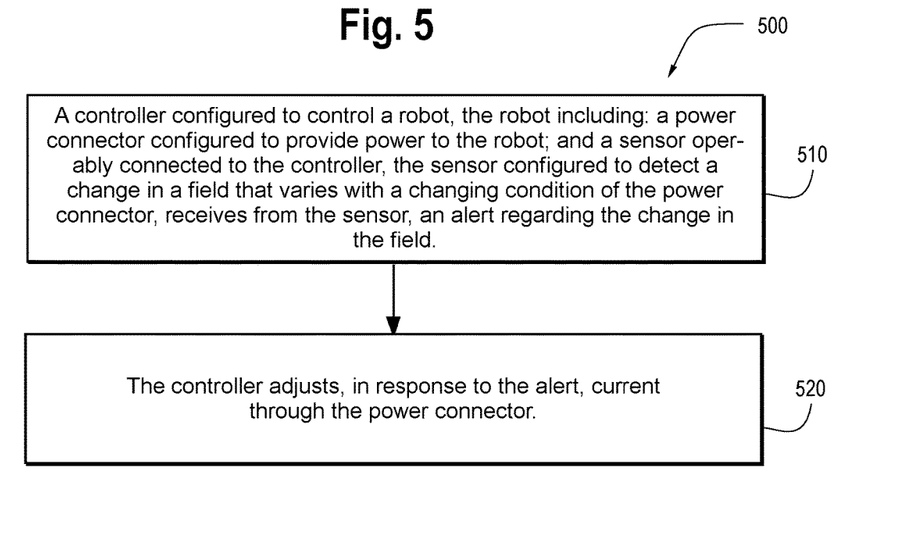
FIG. 5 is a flow chart of a method for predicting robotic power disconnection.

FIG. 5 is a flow chart of a method 500 for predicting robotic power disconnection.

The order of the steps in the method 500 is not constrained to that shown in FIG. 5 or described in the following discussion. Several of the steps could occur in a different order without affecting the final result.

In step 510, a controller configured to control a robot, the robot including: a power connector configured to provide power to the robot; and a sensor operably connected to the controller, the sensor configured to detect a change in a field that varies with a changing condition of the power connector, receives from the sensor, an alert regarding the change in the field. Block 510 then transfers control to block 520.

In step 520, the controller adjusts, in response to the alert, current through the power connector. Block 520 then terminates the process.

For example, it will be understood by those skilled in the art that software used by the system and method for predicting robotic power disconnection may be located in any location in which it may be accessed by the system. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system for predicting a robotic power disconnection comprising:
   a controller; and
   a robot controllable by the controller,
   the robot comprising:
   a power connector configured to provide power to the robot; and
   a sensor operably connected to the controller,
     the sensor configured to detect a change in a field that varies with a changing condition of the power connector,
     the sensor further configured to alert the controller regarding the change in the field,
     the controller configured to adjust current through the power connector in response to the alert, wherein the sensor comprises a capacitive sensor configured to detect a change in an electric field.

2. A system for predicting a robotic power disconnection comprising:
   a controller; and
   a robot controllable by the controller,
   the robot comprising:
   a power connector configured to provide power to the robot; and
   a sensor operably connected to the controller,
     the sensor configured to detect a change in a field that varies with a changing condition of the power connector, the sensor further configured to alert the controller regarding the change in the field, the controller configured to adjust current through the power connector in response to the alert, wherein the sensor comprises a magnetic sensor configured to detect a change in a magnetic field.

3. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the sensor comprises an inductive sensor configured to detect a change in one or more of an electric field and a magnetic field.

4. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the sensor comprises an infrared sensor configured to detect a change in reflected light.

5. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the sensor is configured to detect movement near the robot of an appendage of a human user, wherein the appendage comprises an arm.

6. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller predicts the disconnection by, using a pre-determined jump condition, classifying regions scanned by the sensor into regions comprising the appendage and regions not comprising the appendage.

7. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller predicts the disconnection by, using a pre-determined jump condition, classifying regions scanned by the sensor into regions comprising the appendage and regions not comprising the appendage, wherein the controller classifies regions using a metric.

8. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller predicts the disconnection by, using a pre-determined jump condition, classifying regions scanned by the sensor into regions comprising the appendage and regions not comprising the appendage, wherein the controller classifies regions using a metric, wherein the metric is automatically trained from sample data using algorithms.

9. A system for predicting a robotic power disconnection comprising:
a controller; and
a robot controllable by the controller,
the robot comprising:
a power connector configured to provide power to the robot; and
a sensor operably connected to the controller, the sensor configured to detect a change in a field that varies with a changing condition of the power connector, the sensor further configured to alert the controller regarding the change in the field, the controller configured to adjust current through the power connector in response to the alert, wherein the controller predicts that an appendage will disconnect power to the robot, wherein the controller predicts the disconnection by, using a pre-determined jump condition, classifying regions scanned by the sensor into regions comprising the appendage and regions not comprising the appendage, wherein the controller classifies regions using a metric, wherein the metric is automatically trained from sample data using algorithms, wherein the algorithms comprise one or more of Adaptive Boosting ("Adaboost") and a decision tree.

10. A system for predicting a robotic power disconnection comprising:

a controller; and a robot controllable by the controller, the robot comprising:

a power connector configured to provide power to the robot; and a sensor operably connected to the controller, the sensor configured to detect a change in a field that varies with a changing condition of the power connector, the sensor further configured to alert the controller regarding the change in the field, the controller configured to adjust current through the power connector in response to the alert, wherein the controller predicts that an appendage will disconnect power to the robot, wherein the controller classifies regions by fitting a circle to scan points scanned by the sensor.

11. A system for predicting a robotic power disconnection comprising:

a controller; and a robot controllable by the controller, the robot comprising:

a power connector configured to provide power to the robot; and a sensor operably connected to the controller, the sensor configured to detect a change in a field that varies with a changing condition of the power connector, the sensor further configured to alert the controller regarding the change in the field, the controller configured to adjust current through the power connector in response to the alert, wherein the controller predicts that an appendage will disconnect power to the robot, wherein the controller classifies regions by fitting a circle to scan points scanned by the sensor, wherein the controller classifies regions by checking that the circle falls within an allowable region of radii.

12. A system for predicting a robotic power disconnection comprising:

a controller; and a robot controllable by the controller, the robot comprising:

a power connector configured to provide power to the robot; and a sensor operably connected to the controller, the sensor configured to detect a change in a field that varies with a changing condition of the power connector, the sensor further configured to alert the controller regarding the change in the field, the controller configured to adjust current through the power connector in response to the alert, wherein the controller predicts that an appendage will disconnect power to the robot, wherein, using the jump condition, the controller checks a maximum distance between points and discards segments that are one or more of too large to comprise an appendage and too small to comprise an appendage.

13. A system for predicting a robotic power disconnection comprising:

a controller; and a robot controllable by the controller, the robot comprising:

a power connector configured to provide power to the robot; and a sensor operably connected to the controller, the sensor configured to detect a change in a field that varies with a changing condition of the power connector, the sensor further configured to alert the controller regarding the change in the field, the controller configured to adjust current through the power connector in response to the alert, wherein the controller predicts that an appendage will disconnect power to the robot, wherein, using the jump condition, the controller requires a pre-determined minimum number of points in order to identify a region as comprising an appendage.

14. A system for predicting a robotic power disconnection comprising:

a controller; and a robot controllable by the controller, the robot comprising:

a power connector configured to provide power to the robot; and a sensor operably connected to the controller, the sensor configured to detect a change in a field that varies with a changing condition of the power connector, the sensor further configured to alert the controller regarding the change in the field, the controller configured to adjust current through the power connector in response to the alert, wherein the controller predicts that an appendage will disconnect power to the robot, wherein, using the jump condition, the controller requires a pre-determined minimum number of points in order to identify a region as comprising an appendage, wherein the controller is provided with a predetermined threshold of points above which the controller determines that an appendage lies within the bounding region.

15. A system for predicting a robotic power disconnection comprising:

a controller; and a robot controllable by the controller, the robot comprising:

a power connector configured to provide power to the robot; and a sensor operably connected to the controller, the sensor configured to detect a change in a field that varies with a changing condition of the power connector, the sensor further configured to alert the controller regarding the change in the field, the controller configured to adjust current through the power connector in response to the alert, wherein the controller predicts that an appendage will disconnect power to the robot, wherein the controller is further configured, upon identifying an appendage, to adjust current through the power connector.

16. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller is programmed with a bounding region that is meant to be kept free from appendages in order to prevent an unplanned power disconnection.

17. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller is further configured to identify a recognized feature using sensor data received from the sensor.

18. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller is further configured to identify a recognized feature using sensor data received from the sensor, wherein the controller is further configured to identify the recognized feature as an appendage.

19. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller is further configured to identify a recognized feature using sensor data received from the sensor, wherein the controller is further configured to identify the recognized feature as an appendage, wherein the controller is further configured to notify a computer regarding a predicted robotic power disconnection.

20. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller is further configured to identify a non-recognized feature using sensor data received from the sensor.

21. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller is further configured to identify a non-recognized feature using sensor data received from the sensor, wherein the non-recognized feature comprises a wall.

22. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller classifies regions by fitting a circle to scan points scanned by the sensor, wherein the jump condition requires that the scan be segmented into regions in which no successive scans are more than a fixed distance apart.

23. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller classifies regions by fitting a circle to scan points scanned by the sensor, wherein the jump condition requires that the scan be segmented into regions in which no successive scans are more than a fixed distance apart, wherein the fixed distance comprises 6 centimeters.

24. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller classifies regions by fitting a circle to scan points scanned by the sensor, wherein the jump condition requires that the scan be segmented into regions in which no successive scans are more than a fixed distance apart, wherein the controller is further configured, using the jump condition, to allocate the scans to regions, thereby identifying a recognized feature.

25. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller is further configured to identify a non-recognized feature using sensor data received from the sensor, wherein the controller is further configured to identify the non-recognized feature.

26. A system for predicting a robotic power disconnection comprising:
a controller; and
a robot controllable by the controller,
the robot comprising:
a power connector configured to provide power to the robot; and
a sensor operably connected to the controller,
the sensor configured to detect a change in a field that varies with a changing condition of the power connector,
the sensor further configured to alert the controller regarding the change in the field,
the controller configured to adjust current through the power connector in response to the alert, wherein the controller predicts that an appendage will disconnect power to the robot, wherein the controller is further configured to identify a non-recognized feature using sensor data received from the sensor, wherein the controller is further configured to identify the non-recognized feature, wherein the controller is further configured to direct a computer to ignore the non-recognized feature.

27. A system for predicting a robotic power disconnection comprising:
a controller; and
a robot controllable by the controller,
the robot comprising:
a power connector configured to provide power to the robot, the power connector comprising a magnet; and
a magnetic sensor operably connected to the controller,
the magnetic sensor configured to detect a change in a magnetic field created by the magnet,
the magnetic sensor further configured to alert the controller regarding the change in strength,
the controller configured to adjust current through the power connector in response to the alert.

28. The system of claim 27, wherein the controller receives from the magnetic sensor information regarding the magnetic field that is sensed by the sensor while a full power connection exists.

29. The system of claim 28, wherein the information regarding the magnetic field comprises information regarding the strength of the magnetic field.

30. The system of claim 28, wherein as the power connector is disconnected, the magnetic sensor senses a different portion of the magnetic field.

31. The system of claim 30, wherein the magnetic sensor alerts the controller regarding the change in the portion of the magnetic field that is sensed by the magnetic sensor.

32. The system of claim 31, wherein the controller predicts one or more of a partial power disconnection and a complete power disconnection.

33. The system of claim 32, wherein the controller reports the one or more of a partial power disconnection and a complete power disconnection to a computer.

34. The system of claim 33, wherein the computer directs the controller to adjust current through the power connector and on to the robot.

35. The system of claim 32, wherein, in response to the one or more of a partial power disconnection and a complete power disconnection, the controller reduces the current through the power connector and on to the robot.

36. A method for predicting a robotic power disconnection comprising:
receiving, by a controller configured to control a robot, the robot comprising: a power connector configured to provide power to the robot; and a sensor operably connected to the controller, the sensor configured to detect a change in a field that varies with a changing condition of the power connector, from the sensor, an alert regarding the change in the field; and
adjusting, by, the controller, in response to the alert, current through the power connector, further comprising a step, performed after the step of receiving and before the step of adjusting, of:
predicting, by the controller, a disconnection of power to the robot, wherein the step of predicting further comprises predicting that an appendage will disconnect power to the robot, wherein the step of predicting further comprises predicting the disconnection by, using a pre-determined jump condition, classifying regions scanned by the sensor into regions comprising the appendage and regions not comprising the appendage, wherein the step of predicting further comprises fitting a circle to scan points scanned by the sensor.

37. The method of claim 36, wherein the step of predicting further comprises checking, by the controller that the circle falls within an allowable region of radii.

38. The method of claim 36, wherein the step of predicting further comprises sub-steps of checking, by the controller, a maximum distance between points and discarding, by the controller, segments that are one or more of too large to comprise an appendage and too small to comprise an appendage.

39. The method of claim 36, wherein the step of predicting further comprises a sub-step of identifying, by the controller, a recognized feature using the sensor data.

40. The method of claim 39, wherein the sub-step of identifying further comprises identifying, by the controller, the recognized feature as an appendage.

41. The method of claim 40, further comprising a step, performed after the step of predicting, of notifying a computer, by the controller, regarding a predicted robotic power disconnection.

42. The method of claim 36, wherein the step of predicting further comprises a sub-step of identifying, by the controller, a non-recognized feature using the sensor data.

43. The method of claim 39, wherein the jump condition requires that the scan be segmented into regions in which no successive scans are more than a fixed distance apart.

44. A method for predicting a robotic power disconnection comprising:
receiving, by a controller configured to control a robot, the robot comprising: a power connector configured to provide power to the robot; and a sensor operably connected to the controller, the sensor configured to detect a change in a field that varies with a changing condition of the power connector, from the sensor, an alert regarding the change in the field; and
adjusting, by, the controller, in response to the alert, current through the power connector, further comprising a step, performed after the step of receiving and before the step of adjusting, of:
predicting, by the controller, a disconnection of power to the robot, wherein the step of predicting further comprises predicting that an appendage will disconnect power to the robot, wherein the step of predicting further comprises predicting the disconnection by, using a pre-determined jump condition, classifying regions scanned by the sensor into regions comprising the appendage and regions not comprising the appendage, wherein the step of predicting further comprises fitting a circle to scan points scanned by the sensor, wherein the step of predicting further comprises allocating, by the controller, using the jump condition, the scans to regions, thereby identifying a recognized feature.

45. The method of claim 42, further comprising a step, performed after the sub-step of identifying the non-recognized feature, of:
directing a computer, by the controller, to ignore the non-recognized feature.

* * * * *

UNITED STATES PATENT AND TRADEMARK OFFICE
CERTIFICATE OF CORRECTION

PATENT NO. : 9,956,688 B2
APPLICATION NO. : 15/096896
DATED : May 1, 2018
INVENTOR(S) : Ferguson et al.

It is certified that error appears in the above-identified patent and that said Letters Patent is hereby corrected as shown below:

On the Title Page

Please add "Related U.S. Application Data" section as shown below:
"Provisional application No. 62/146,395, filed on April 12, 2015."

Signed and Sealed this
Twenty-third Day of August, 2022

Katherine Kelly Vidal
*Director of the United States Patent and Trademark Office*